United States Patent [19]

Bose

[11] 4,276,505

[45] Jun. 30, 1981

[54] MICROCOMPUTER-BASED CONTROL APPARATUS FOR A LOAD-COMMUTATED INVERTER SYNCHRONOUS MACHINE DRIVE SYSTEM

[75] Inventor: Bimal K. Bose, Latham, N.Y.

[73] Assignee: General Electric Company, Schenectady, N.Y.

[21] Appl. No.: 135,215

[22] Filed: Mar. 31, 1980

[51] Int. Cl.$^3$ ............... H02P 5/28; H02P 5/34; H02P 7/36

[52] U.S. Cl. .................. 318/723; 318/717; 318/802; 318/809

[58] Field of Search ............... 318/712, 713, 714, 716, 318/717, 718, 720, 721, 722, 723, 724, 731, 732, 798, 799, 800, 801, 802, 803, 807, 809, 810, 811, 812

[56] References Cited

U.S. PATENT DOCUMENTS

| 3,775,649 | 11/1973 | Bayer et al. | 318/721 X |
| 4,088,935 | 5/1978 | D'Atre et al. | 318/802 |
| 4,099,107 | 7/1978 | Eder | 318/802 |
| 4,207,510 | 6/1980 | Woodbury | 318/802 |
| 4,215,305 | 7/1980 | D'Atre et al. | 318/803 |

FOREIGN PATENT DOCUMENTS

2726410 12/1978 Fed. Rep. of Germany ........... 318/801

Primary Examiner—J. V. Truhe
Assistant Examiner—Richard M. Moose
Attorney, Agent, or Firm—William H. Steinberg; James C. Davis, Jr.; Paul R. Webb, II

[57] ABSTRACT

A load-commutated inverter synchronous machine drive system control apparatus comprises at least one microcomputer for determining optimum or desired values for inverter turn-off time, inverter link current and machine air gap flux from machine drive system voltage and currents. Inverter frequency is regulated in accordance with the difference in magnitude between optimum and actual inverter turn-off time to minimize the inverter turn-off angle irrespective of machine frequency, thereby reducing synchronous machine reactive power. Inverter link current and synchronous machine field current are regulated responsive to the difference in magnitude between optimum and actual inverter link current and the difference in magnitude between optimum and actual machine air gap flux, respectively, thereby assuring machine operation at maximum efficiency.

20 Claims, 17 Drawing Figures

MICROCOMPUTER-BASED CONTROL APPARATUS FOR A LOAD-COMMUTATED INVERTER SYNCHRONOUS MACHINE DRIVE SYSTEM

BACKGROUND OF THE INVENTION

This invention relates generally to inverter synchronous machine drive systems, and more specifically, to an improved control apparatus for operating an inverter synchronous machine drive system at maximum machine efficiency with reduced machine reactive power.

Inverter-synchronous machine drive systems are commonly employed in industrial applications, such as glass making, textile processing and the like, where a wide range of machine speed control is desired. Typically, such inverter-synchronous machine drive systems are comprised of a multi-phase synchronous machine which is excited through an inverter from a direct current source, usually a phase controller rectifier. Preferably, the inverter comprises a plurality of pairs of controlled switching devices, such as thyristors, the number of pairs of thyristors corresponding to the number of machine phases, with each of the thyristors of each pair coupled in series-aiding fashion, and each of the serially coupled pairs of thyristors coupled across the direct current source. When the thyristors of each pair are rendered conductive in a prescribed sequence, alternating current is supplied to the machine by the inverter. By regulating the inverter thyristor firing frequency, the inverter output frequency and hence machine speed can be controlled accordingly. Varying the amplitude of the link current supplied by the phase controlled rectifier varies the inverter output current amplitude.

Heretofore, control devices employed to regulate inverter thyristor conduction have been comprised of dedicated hardware designed to maintain a fixed turn-off angle, $\delta$, the turn-off angle being the angular period during which a reverse bias voltage is applied across the then-conductive or outgoing inverter thyristor to render it nonconductive. Fixing the inverter turn-off angle incurs no difficulty if inverter frequency is fixed, as is the case for fixed speed drives. This is because the inverter advance angle, $\delta$ that is, the phase delay between initiation of incoming inverter thyristor conduction and the zero crossing of machine phase voltages, can be set to minimize machine reactive power. However, when inverter frequency is varied, as is the case in variable-speed, inverter-synchronous machine drives, fixing the inverter turn-off angle to achieve minimum reactive currents at maximum machine frequencies incurs the problem that at lower speeds the fixed inverter turn-off time corresponding to the fixed turn-off angle is larger than necessary, causing the machine to operate at an unnecessarily low power factor and thereby increasing machine reactive power. Also, prior art inverter-synchronous machine control devices commonly operate to achieve maximum synchronous machine efficiency by regulating inverter link current, that is, the current drawn by the inverter from the direct current source, in accordance with a fixed relationship between inverter link current and air gap flux. The principle of operation of such prior art control devices is based on the assumption that machine load torque varies in a predetermined relationship with machine frequency, machine parameters remain constant and that the form factor of the machine voltage, machine current and machine flux waveforms remains constant. Unfortunately, such ideal conditions hardly ever exist during operation of a typical inverter-synchronous machine drive system under normal circumstances and hence, maximum machine efficiency is usually not achieved by the use of such prior art control devices.

In contrast to such prior art control devices, the inverter-synchronous machine drive system control apparatus of the present invention optimizes inverter thyristor turn-off time irrespective of machine frequency, thereby minimizing inverter-machine drive system reactive power. Additionally, the control apparatus of the present invention regulates inverter link current and machine field current in accordance with real time machine efficiency to assure inverter-synchronous machine drive system operation at maximum efficiency irrespective of machine speed and torque.

BRIEF SUMMARY OF THE INVENTION

It is an object of the present invention to provide a microcomputer-based, inverter-synchronous machine drive system control apparatus which advantageously optimizes inverter switching device turn-off time to minimize machine reactive power;

It is another object of the present invention to provide a microcomputer-based, inverter-synchronous machine drive system control apparatus which advantageously optimizes inverter link current and synchronous machine field current to obtain maximum machine efficiency irrespective of machine speed and torque.

Briefly, in accordance with the preferred embodiment of the invention, an improved control apparatus for operating a load-commutated inverter-synchronous machine drive system at optimum efficiency with reduced machine reactive power comprises first, second and third circuits. The first circuit, coupled to the synchronous machine and to the synchronous machine field voltage supply, determines optimum synchronous machine air gap flux, that is, that magnitude of flux necessary to achieve maximum machine efficiency, and adjusts synchronous machine field current by varying machine field voltage responsive to the difference in magnitude between optimum synchronous machine air gap flux and actual synchronous machine air gap flux. The second circuit, coupled to the synchronous machine and to the inverter link voltage supply, determines optimum inverter link current, that is, that magnitude of link current necessary to achieve maximum machine efficiency, and adjusts the link current amplitude by varying inverter link voltage responsive to the difference in magnitude between optimum and actual inverter link current. By adjusting synchronous machine field current and inverter link current in this manner, machine efficiency is maximized regardless of torque and speed conditions. The third circuit, coupled to the inverter and to the synchronous machine, determines optimum inverter turn-off time, that is, that turn-off time which minimizes the turn-off angles, and adjusts inverter frequency responsive to the difference in magnitude between optimum and actual inverter turn-off time. Regulating machine frequency in this way minimizes reactive machine power which also improves machine efficiency.

Preferably, each of the first, second and third circuits, respectively, is comprised of a processor and a control loop. Each of the circuit processors may be configured to an individual microcomputer or, as in the presently preferred embodiment, a pair of microcomputers can serve as the processor for each of the three circuits. Use of microcomputers permits considerable simplification of hardware and allows various diagnostic routines to be included to permit easy servicing.

BRIEF DESCRIPTION OF THE DRAWINGS

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

DETAILED DESCRIPTION OF THE PREFERRED EMBODIMENT

Figure 1:
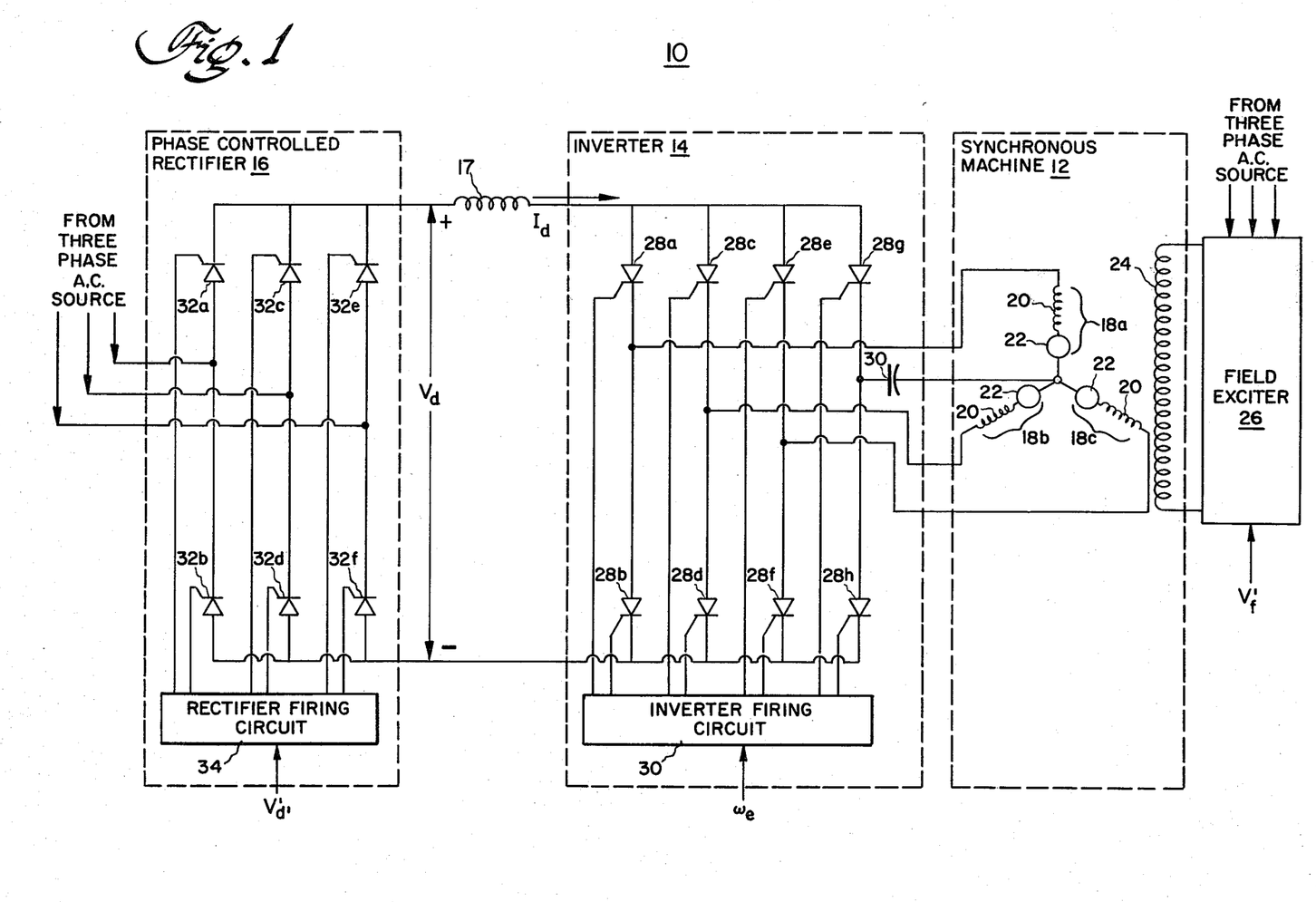
FIG. 1 is a schematic diagram of a load-commutated inverter-synchronous machine drive system.
Figure 2:
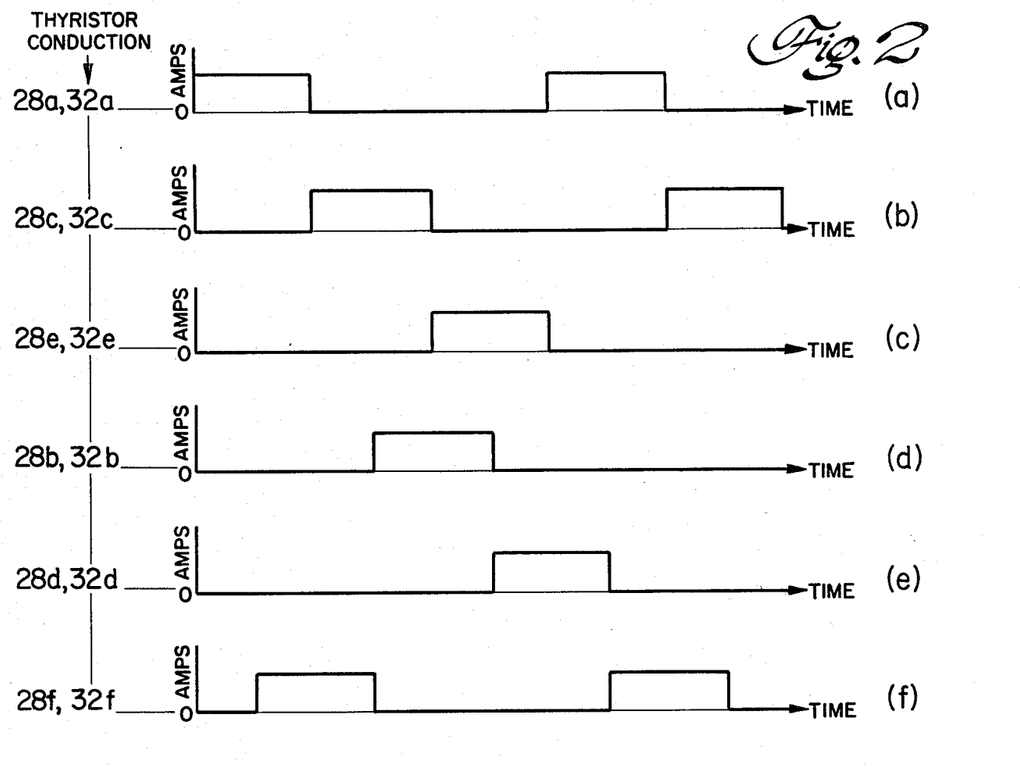
FIGS. 2a-2f each illustrate the conductivity of a separate one of the respective inverter thyristors and a separate one of the respective phase controlled rectifier thyristors, employed in the apparatus of FIG. 1.

FIG. 1 illustrates a load commutated inverter synchronous machine drive system 10 comprising a synchronous machine 12 which is supplied from an inverter 14 with variable frequency, variable amplitude alternating current. Inverter 14 is energized by a direct current voltage source 16. Preferably, direct current voltage source 16 comprises a phase controlled rectifier coupled in series with a filter inductance 17. In the presently illustrated embodiment, synchronous machine 12 comprises a three phase machine with each of machine phases 18a, 18b and 18c represented by a phase inductance 20 and a voltage source 22 whose output voltage varies in accordance with synchronous machine phase EMF. The field 24 of synchronous machine 12 is supplied with variable amplitude direct current voltage from an a-c energized field exciter circuit 26. Field voltage $V_f$ supplied by field exciter 26 varies in amplitude in accordance with field voltage control signal $V_f'$ supplied to the field exciter circuit from a control apparatus (not shown). Various field exciter circuits exist and selection of an appropriate field exciter circuit will depend on desired design characteristics. Therefore, the details of field exciter circuit 26 are not shown. For a further, more detailed discussion of synchronous machine field exciter circuits, reference should be had to the text *Power Semiconductor Circuits* by Dewan and Straughen (John Wiley & Sons, 1975).

With synchronous machine 12 configured of a three phase machine, inverter 14 typically is configured of a three phase bridge inverter comprising three pairs of main thyristors 28a and 28b, 28c and 28d and 28e and 28f, respectively, with the thyristors of each pair coupled in series aiding fashion, and each of the serially-coupled pairs of thyristors connected across the serial combination of phase controlled rectifier 16 and inductance 17. Each pair of serially coupled inverter main thyristors is coupled at the junction between thyristors to a separate one of machine phases 18a, 18b and 18c, respectively. Inverter 14 also includes a pair of auxiliary thyristors 28g and 28h serially coupled across the serial combination of phase controlled rectifier 16 and inductance 17. The junction between rectifiers 28g and 28h is coupled through a commutating capacitance 30 to the neutral of synchronous machine 12.

Inverter main thyristors 28a-28f and inverter auxiliary thyristors 28g and 28h are rendered conductive in a predetermined sequence responsive to firing signals supplied to the gate of each thyristor from an inverter firing circuit 30 which in turn is responsive to a frequency control signal $\omega_e$ supplied from the external control apparatus (not shown). Various circuits for firing inverter thyristors in accordance with a frequency control signal exist and are well known in the art. Therefore, the details of inverter firing circuit 30 are not shown. For a further, more detailed discussion of thyristor firing circuits, reference should be had to the General Electric *Silicon Controlled Rectifier Handbook* (5th Edition) published by Semiconductor Products Department of General Electric Company, Syracuse, New York (1972).

The structure of phase controlled rectifier 16 is determined by the nature of the available source of alternating current. In the presently preferred embodiment, with a commercial three phase alternating current source assumed, phase controlled rectifier 16 is configured of a three phase rectifier bridge and comprises three pairs of thyristors 32a and 32b, 32c and 32d and 32e and 32f, respectively, with the thyristors of each thyristor pair coupled in series aiding fashion and each of the serially coupled pairs of thyristors connected in series with inductance 17 across inverter thyristor pairs 28a and 28b, 28c and 28d, 28e and 28f and 28g and 28h. The pairs of phase controlled rectifier thyristors are each poled oppositely to the pairs of inverter thyristors. The junction between thyristors 32a and 32b, 32c and 32d and 32e and 32f, respectively, is coupled to a separate one of the three phases, respectively, of a three phase alternating current source (not shown).

Phase controlled rectifier thyristors 32a-32f are rendered conductive in a predetermined sequence responsive to firing signals supplied to the gate of each thyristor from a thyristor firing circuit 34 which is responsive to a voltage control signal $V_d$ supplied by the external control circuit (not shown). Various thyristor firing circuits exist and are well known in the art. Therefore, the details of rectifier firing circuit 34 are not shown. For a further, more detailed description of such thyristor firing circuits, reference should be had to the above-identified *General Electric Silicon Controlled Rectifier Handbook*.

Operation of inverter drive system 10 may best be understood by reference to FIGS. 2a through 2f. Phase controlled rectifier thyristors 32a, 32c and 32e are sequentially rendered conductive and phase controlled rectifier thyristors 32f, 32b and 32d are sequentially rendered conductive. Each phase controlled rectifier thyristor remains conductive for a duration of ⅔f where f is the frequency of alternating current supplied to phase controlled rectifier 16. Each of thyristors 32f, 32b and 32d respectively is rendered conductive after an interval of duration 1/6 f following the conduction of each of thyristors 32a, 32c and 32e, respectively. Each of thyristors 32a through 32f is commutated, that is, rendered nonconductive, following the initiation of thyristor conduction, when an appropriate one of the three phase alternating current voltages reverse biases the then-conductive thyristor. The conduction of thyristors 32a, 32c, 32e and 32b, 32d and 32f, respectively, is graphically illustrated by FIGS. 2a, 2b, 2c, 2d, 2e and 2f, respectively.

Figure 3:
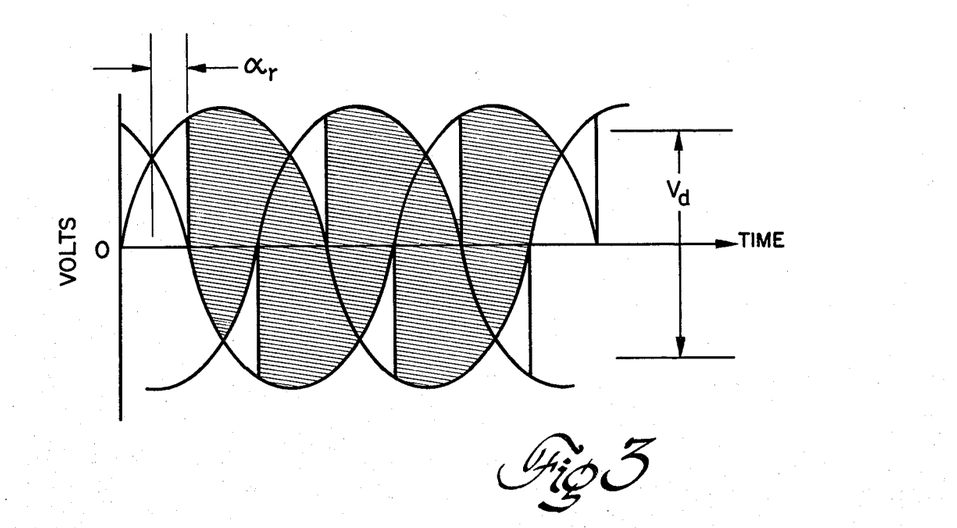
FIG. 3 illustrates phase controlled rectifier output voltage as a function of time.

Referring to FIG. 3 which illustrates phase controlled rectifier output voltage $V_d$ as a function of time superimposed on the three phase input voltage waveform, if the phase controlled rectifier firing angle $\alpha_r$, that is, the phase delay interval between the zero crossing of a successive pair of alternating current input voltages and the subsequent initiation of thyristor conduction, is less than 90°, then a direct current voltage appears across the input of inverter 14 of FIG. 1. By varying the phase controlled rectifier thyristor firing angle $\alpha_r$ in accordance with voltage control signal $V_d'$ supplied to rectifier firing circuit 34 of FIG. 1, the amplitude of the direct current voltage supplied to inverter 14 can be regulated accordingly.

Operation of inverter 14 of FIG. 1 may be better understood by reference to FIGS. 2a through 2f and FIGS. 4a and 4b. For purposes of this discussion, the link or input current supplied to inverter 14, designated as $I_d$, is assumed to be substantially ripple-free, an assumption that is not unreasonable if inductance 17 of FIG. 1 is selected of sufficient magnitude to filter the phase controlled rectifier output current. To supply synchronous machine 12 with alternating currents in a proper three phase relationship with one another, inverter main thyristors 28a, 28c and 28e and inverter main thyristors 28f, 28b and 28d are sequentially rendered conductive by inverter firing circuit 30 responsive to the frequency control signal $\omega_e$. Inverter main thyristors 28a, 28c and 28e and 28f, 28b and 28d are each rendered conductive for an interval of duration $2\pi/3\Omega$ where $\Omega$ is the angular rotation frequency of synchronous machine 12, with thyristors 28f, 28b and 28d each being rendered conductive after an interval of duration $\pi/3\Omega$ following initiation of conduction of one of main thyristors 28a, 28c and 28e, respectively. FIGS. 2a through 2f graphically illustrate the conduction of thyristors 28a, 28c, 28e, 28f, 28b and 28d, respectively.

Initially, each of inverter main thyristors 28a, 28c and 28e of FIG. 1 is commutated at an appropriate interval following the initiation of thyristor conduction when thyristor 28g is rendered conductive to couple commutating capacitance 30 and one of machine phases 18a, 18b and 18c across the then-conductive inverter main thyristor. Likewise, inverter main thyristor 28f, 28b and 28d are each commutated when thyristor 28h is rendered conductive. Thyristor 28g is itself commutated following the conduction of a successive one of thyristors 28a, 28c and 28e, and similarly, thyristor 28h is commutated following the conduction of a successive one of thyristors 28f, 28b and 28d, respectively.

The above-described sequence of inverter thyristor conduction is continually repeated, causing synchronous machine 12 to become excited and commence rotation. Once synchronous machine exceeds a predetermined machine speed, inverter thyristors 28a–28f are each commutated by synchronous machine emf, and inverter thyristors 28g and 28h are no longer rendered conductive after having been commutated.

Figure 4A:
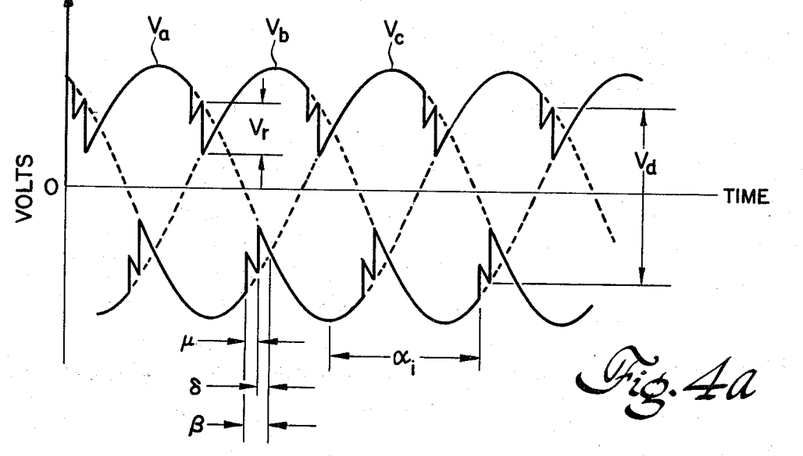
FIG. 4a illustrates inverter output voltage as a function of time.
Figure 4B:
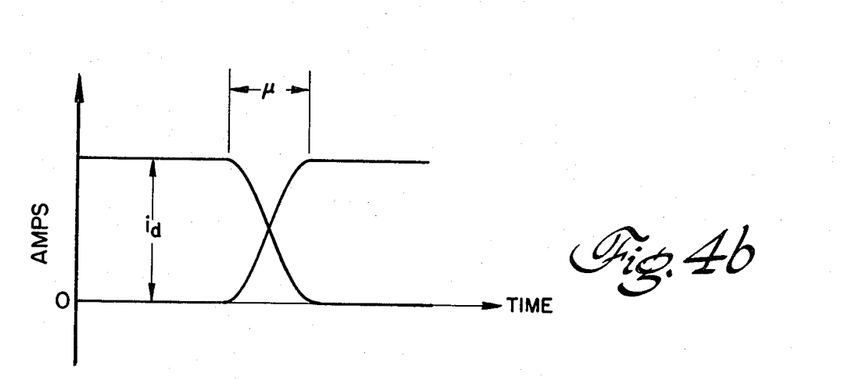
FIG. 4b illustrates the current carried by a commutated inverter thyristor and by the succeeding incoming inverter thyristor as a function of time.

Referring to FIG. 4a, there is illustrated the waveform of inverter output voltage superimposed on the waveform of the inverter input voltage $V_d$. By controlling the inverter firing angle $\alpha_i$, that is, the phase delay between the zero crossings of the machine phase voltages, respectively, and the subsequent initiation of inverter thyristor conduction, respectively, the overlap angle $\mu$, that is, the phase angle during which both the incoming and then-conductive or outgoing inverter thyristor are conductive, as seen more clearly in FIG. 4b, can be varied, thereby reducing the phase angle between machine voltage and current and hence reducing machine reactive power. It is desirable to operate the inverter with $\alpha_i = 180°$ and $\delta°$ the angular period during which the incoming thyristor is reverse biased both equal to 0° so that the phase delay between machine current and voltage is small and machine reactive power is negligible. In practice, however, it is not possible to operate a load commutated current-fed inverter, such as inverter 14 of FIG. 1, with $\alpha_i = 180°$. The reason for this is that each inverter thyristor, when commutated, does not instantaneously become nonconductive and thereby block forward voltage, but rather each thyristor, when commutated, gradually ceases to conduct inverter link current over a relatively brief interval as is illustrated in FIG. 4b. If the phase angle, designated as the advance angle $\beta$, between commencement of commutation of a then-conductive inverter thyristor, and subsequent zero crossing of voltage, is of such a limited duration that the then-commutated inverter thyristor has yet to block forward voltage before the incoming main thyristor commences current conduction, then the inverter thyristor undergoing commutation may be retriggered into conduction, resulting in inverter commutation failure. The advance angle $\beta$ is related to the inverter firing angle $\alpha_i$ by the relationship $$\beta = 180° - \alpha_i$$

Heretofore, present day load commutated inverter synchronous machine drive systems, such as drive system 10, have been designed such that the turn-off angle $\delta$, remains fixed regardless of machine frequency. As the turn-off angle required for completion of thyristor commutation varies directly with machine frequency $\delta$, must be selected of sufficient magnitude so that inverter commutation failure is avoided at maximum machine frequency. With $\delta$ fixed to avoid inverter commutated failure at maximum machine frequency, the synchronous machine operates at a lower power factor than necessary when machine frequency is less than the maximum machine frequency. If, however, the thyristor advance angle $\beta$ is varied in accordance with machine frequency so that $\delta$ is always at the lowest possible value, then machine reactive power is reduced and machine efficiency is increased, thereby saving energy. For high horsepower load commutated inverter synchronous machine drive systems, even a small increase in machine efficiency results in large energy savings.

Figure 4C:
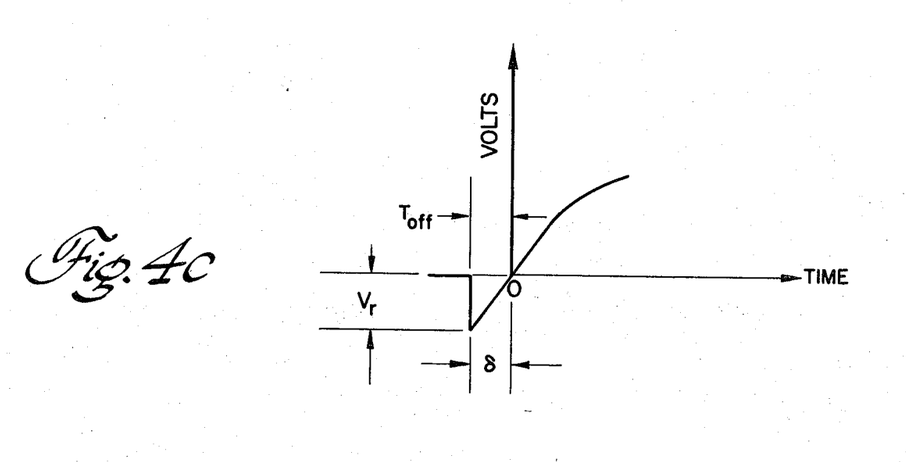
FIG. 4c illustrates the voltage across each outgoing inverter thyristor as a function of time.

Minimization of the angle $\beta$ in accordance with the method of the present invention may be better understood by reference to FIGS. 4a, 4b and 4c. In FIGS. 4a and 4b, it can be seen that $\beta$, the advance angle, can be expressed as $$\beta = \mu + \delta \qquad \text{(equation 2)}$$

where $\mu$ is the commutation overlap angle, $\delta$ and is turn-off angle. The angle $\delta$ is related to the time $T_{off}$, the interval during which the outgoing thyristor is reverse biased, and to the machine frequency by the expression $$\delta = \Omega T_{off} \qquad \text{(equation 3)}$$

Figure 5A:
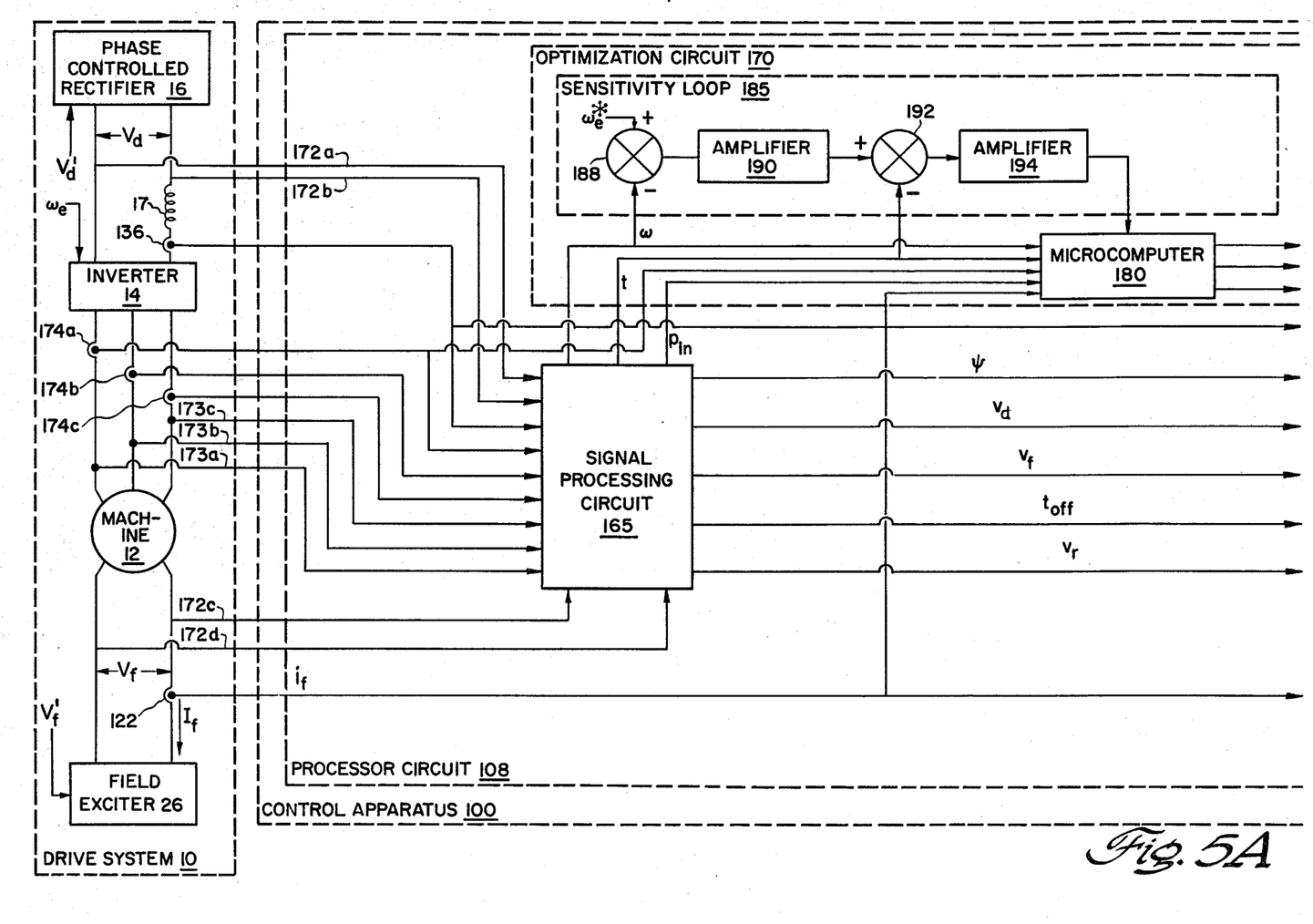
FIGS. 5a and 5b are a block diagram of the control apparatus of the present invention.
Figure 5B:
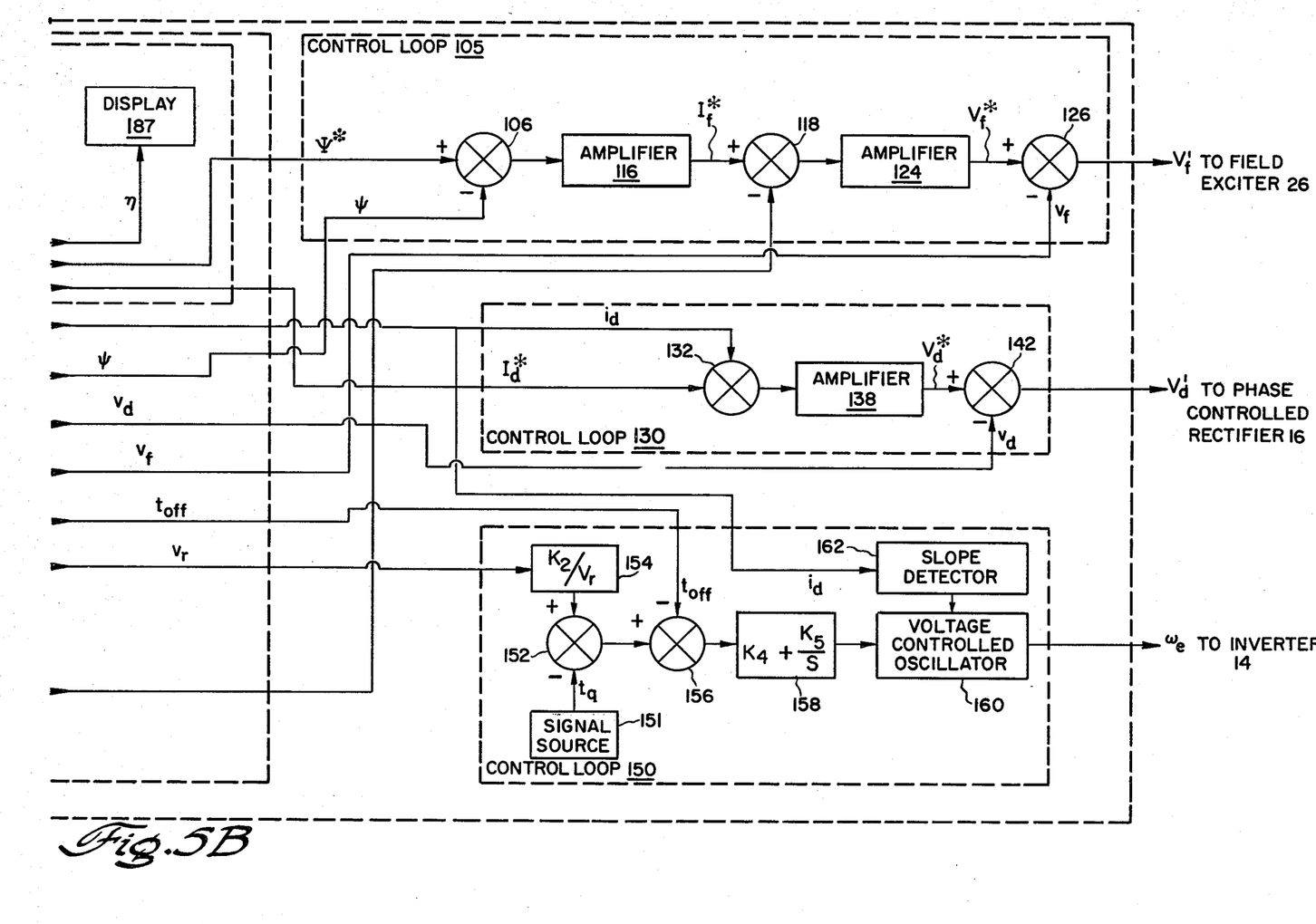

In FIG. 4c, $T_{off}$ is shown as being inversely related to $V_r$, the peak reverse bias voltage across the outgoing thyristor. The time $T_{off}$ is also directly related to the parameter $T_q$, the minimum allowable thyristor turn-off time which varies in accordance with physical device characteristics. Typically, for thyristors employed in load commutated inverter drives $T_q$ is approximately 30 microseconds. As $T_{off}$ is proportionately related to $T_q$ and inversely to $V_r$, $T_{off}$ can be expressed by the relationship $$T_{off} = K_1 T_q + K_2/V_r \qquad \text{(equation 4)}$$

where $K_1$ and $K_2$ are constants. Once the magnitude of $V_r$ has been determined, $T_{off}$ can be computed in accordance with equation (4). If the interval during which the thyristor reverse bias voltage decreases to zero is measured, then the actual magnitude of $T_{off}$ can be established. By regulating inverter thyristor conduction in accordance with the difference between the computed and the actual value of $T_{off}$, the thyristor turn-off angle $\delta$ can be minimized, thereby reducing synchronous machine reactive power. A control apparatus 100 for regulating the frequency of inverter thyristor conduction to minimize the thyristor turn-off angle and for regulating inverter input current and machine field current to maximize synchronous machine efficiency, thereby reducing synchronous energy consumption, is shown in block form in FIGS. 5a and 5b. Control apparatus 100 includes a first control loop 105 for regulating synchronous machine field voltage $V_f$. Control loop 105 includes a first summing amplifier 106 which is supplied at the noninvert input from a processor circuit 108 (described in greater detail hereinafter) with a signal $\Psi^*$ varying in accordance with the optimum value of synchronous machine air gap flux, that is, that value of flux required to achieve maximum synchronous machine efficiency at steady state machine conditions. Summing amplifier 106 is supplied at the noninvert input from processor circuit 108 with a signal $\psi$ varying in accordance with actual synchronous machine air gap flux $\psi$. The summing amplifier supplies a flux error signal, varying in accordance with the difference in magnitude between signals supplied to the invert and noninvert summing amplifier inputs, to a high gain amplifier 116. The amplifier scales the flux error signal to produce a field current command signal $I_f^*$, representing the desired magnitude of field current, which is supplied to the noninvert input of a second summing amplifier 118. Summing amplifier 118 is supplied at the invert input from a current sensor 122, coupled in series with field exciter circuit 26 and synchronous machine 12, with a signal $i_f$ varying in accordance with actual synchronous machine field current $I_f$. In accordance with the difference in magnitude between signals supplied to the invert and noninvert summing amplifier inputs, summing amplifier 118 supplies a field current error signal to a amplifier 124 which scales the field current error signal supplied thereto to produce a field voltage command signal $v_f^*$.

A third summing amplifier 126 is supplied at the noninvert input with the field voltage command signal produced by amplifier 124 and, at the invert input from processor 108 with a signal $v_f$ varying in accordance with actual synchronous field voltage $V_f$. In accordance with the difference in magnitude between signals supplied to its invert and noninvert inputs, summing amplifier 126 supplies a voltage control signal $V_f'$ to field exciter circuit 26 which adjusts the field excitation supplied to synchronous machine 26 accordingly.

A second control loop 130 regulates synchronous machine stator current by varying the output voltage amplitude of phase controlled rectifier 16. Control loop 130 comprises a first summing amplifier 132 which is supplied at the noninvert input from processor 108 with a signal $I_d^*$ varying in accordance with optimum inverter link current that is, that magnitude of link required by the inverter to operate the synchronous machine at maximum machine efficiency. Summing amplifier 132 is supplied at the invert input from a current sensor 136, coupled in series with inductor 17 and inverter 16, with a signal $i_d$ varying in accordance with actual inverter link current $I_d$. In accordance with the difference in magnitude between signals supplied to the invert and noninvert summing amplifier inputs, summing amplifier 132 produces an inverter link current error signal which is amplified by by an amplifier 138 to produce the inverter link voltage command signal $v_d^*$ supplied to the noninvert input of a second summing amplifier 142. Summing amplifier 142 is supplied at the invert input from processor 108 with a signal $v_d$ varying in accordance with actual inverter link voltage $V_d$. In accordance with the difference in magnitude between signals supplied to the invert and noninvert summing amplifier inputs, summing amplifier 142 supplies the inverter link voltage control signal $V_d'$ to phase controlled rectifier 16 of FIG. 1. The phase controlled rectifier is responsive to signal $V_d'$ and regulates inverter link voltage amplitude in accordance therewith.

A third control loop 150 regulates inverter frequency to establish an appropriate advance angle so that synchronous machine reactive current is minimized. Control loop 150 comprises a signal source 151 which produces a fixed amplified output signal $t_q$ whose magnitude corresponds to the minimum inverter thyristor turn-off time $T_q$. The output signal produced by signal source 151 is supplied to the first noninvert input of a first summing amplifier 152. An attenuator 154 is supplied from processor circuit 108 with a signal $v_r$, varying in accordance with the reverse bias voltage $V_r$ across each incoming main thyristor of inverter 14, and produces an output signal varying in accordance with $k_2/V_r$, where $k_2$ is a constant. The output signal produced by an attenuator 154 is supplied to the noninvert input of summing amplifier 152. In accordance with the sum of signals supplied to the first and second inputs, summing amplifier 152 supplies an output signal, proportional in magnitude to the expression $T_q + k_2/V_r$, and thus, varying in accordance with inverter turn-off time $T_{off}$, to the noninvert input of a second summing amplifier 156. Summing amplifier 156 is supplied at the invert input from processor 108 with a signal $t_{off}$, varying in accordance with the actual inverter thyristor turn-off time $T_{off}$ which, as will be seen later, is determined from inverter output phase voltages $V_a$, $V_b$ and $V_c$. In accordance with the difference in magnitude between signals supplied to the invert and noninvert summing amplifier inputs, summing amplifier 156 supplies a commutation time error signal to the input of an amplifier 158 configured with an integral plus proportional transfer characteristic. The output signal of amplifier 158, varying in accordance with the integral of the input signal supplied thereto, is supplied to a voltage controlled oscillator 160 which produces the inverter frequency control signal $\omega_e$ supplied to inverter 14.

To reduce the likelihood of inverter commutation failure in the event of transient inverter link currents, voltage controlled oscillator 160 is supplied with the output signal of a slope detector 162. Slope detector 162 is supplied from current sensor 136 with a signal $i_d$ proportional in magnitude to actual inverter link current $I_d$ and, depending on whether inverter link current is increasing or decreasing in magnitude, slope detector 162 causes voltage controlled oscillator 160 to alter the frequency control signal $\omega_e$ supplied to inverter 14 so that the resultant phase difference between the zero crossing of inverter output voltage and initiation of inverter thyristor conduction will be increased or decreased accordingly.

Processor circuit 108, which supplies control loop 105 with signals $\psi^*$, $\Psi$ and $v_f$, control loop 130 with signals $I_d^*$, and $v_d$ and control loop 150 with signals $v_r$ and $t_{off}$, comprises a signal processing circuit 165 and an optimization circuit 170. Signal processing circuit 165 preferably comprises a microcomputer, such as a Model 8086 microcomputer as manufactured by Intel Corp. Microcomputer 165 is supplied via conductors 172a and 172b with inverter link voltage $V_d$ and with synchronous machine field voltage $V_f$ via conductors 172c and 172d. From voltages $V_d$ and $V_f$, microcomputer 165 generates a pair of output signals $v_d$ and $v_f$, each varying in amplitude in accordance with a separate one of voltages $V_d$ and $V_f$, respectively. Microcomputer 165 is supplied from synchronous machine 12 with terminal voltages $V_a$, $V_b$ and $V_c$ via conductors 173a, 173b and 173c, respectively, and from voltages $V_a$, $V_b$ and $V_c$, microcomputer 165 determines the reverse bias voltage $V_r$ across each incoming inverter main thyristor and the thyristor turn-off time $T_{off}$ as follows. Referring back to FIG. 4a, it can be observed that $V_r$ is equal to the difference in magnitude between each pair of successively increasing machine terminal voltages (such as between $V_a$ and $V_b$, for example) at the instant the incoming inverter thyristor is rendered conductive. Thus, the magnitude of $V_r$ can be determined by repeatedly sampling machine terminal voltages and detecting when the difference between successively increasing terminal voltages is most negative. Once $V_r$ is determined, signal $v_r$ can be generated accordingly. If the time period during which the voltage difference between successively increasing machine terminal voltages remains negative is measured, then $T_{off}$ can be determined and signal $t_{off}$ can be generated accordingly.

In order for microcomputer 165 of FIG. 5 to compute synchronous machine air gap flux, $\psi$ the machine frequency $\Omega$ and one of the instantaneous machine phase stator currents $I_a$, $I_b$ and $I_c$ must be determined. Referring once again to FIG. 4a, it can be observed that the time period between successive polarity alternations of one of machine terminal voltages $V_a$, $V_b$ and $V_c$ is inversely proportional to the angular machine frequency. Thus, from repeated sampling of machine terminal voltages, microcomputer 165 can determine machine frequency. Each of the instantaneous machine stator currents varies in amplitude in accordance with a separate one of output signals $i_a$, $i_b$ and $i_c$, respectively, produced by a separate one of current sensors 174a, 174b and 174c, respectively, each being coupled in series with one of the three respective phases of machine 12 and inverter 14, respectively. From one of the machine phase currents, such as $I_a$, and machine frequency $\Omega$, microcomputer 165 computes synchronous machine air gap flux in accordance with the expression $$\psi = \int V_a - I_a R_a - L_a dI_a/dt \qquad (4)$$

where $R_a$ is the machine stator resistance and $L_a$ is the machine leakage inductance. Once $\psi$ has been computed, the signal $\Psi$ is generated to vary accordingly.

Microcomputer 165 of FIGS. 5a and 5b also generates three additional signals $\omega$, t and $p_{in}$ which are supplied to optimization circuit 170. Signal $\Omega$ is generated in accordance with $\Omega$, the machine frequency. Signal t, which varies in accordance with machine torque T, is generated after synchronous machine torque T is determined from the following relationship $$T = (4p/3\Omega)(I_S \psi \sin \theta)$$

where $p$ is the number of synchronous machine poles and $\theta$ is the phase angle between machine stator current and air gap flux and $I_S$ is the peak value of $I_a$. Various algorithms exist for determining $\sin \theta$ from synchronous machine terminal voltages and stator currents and therefore the algorithm for computing $\sin \theta$ is not described.

The signal $p_{in}$ produced by microcomputer 165 varies in accordance with $P_{in}$, the synchronous machine input power and is generated once $P_{in}$ is determined. Synchronous machine input power can easily be determined from synchronous machine terminal voltages and $V_A$, $V_B$ and $V_C$ and instantaneous machine stator currents $I_A$, $I_B$ and $I_C$ in accordance with the relationship $$P_{in} = \int (V_A I_C + V_B I_B + V_C I_C) dt)$$

Optimization circuit 170 includes a microcomputer 180, such as an Intel 8086 microcomputer for generating signals $I_d^*$ and $\Psi^*$, and a sensitivity loop 185 for inhibiting operation of microcomputer 180 during intervals of transient machine conditions. When supplied with signals $\omega$, t, and $p_{in}$ from microcomputer 165, the signals $i_f$ from field current sensor 122 and signal $i_a$ from current sensor 174a, microcomputer 180 calculates synchronous machine losses and employs this parameter to compute synchronous machine efficiency. In computing synchronous machine efficiency, microcomputer 180 first computes synchronous machine losses attributable to machine stator resistance, machine field resistance, machine windage, and machine inductance. Synchronous machine stator resistance loss, designated $P_s$, is determined by microcomputer 180 according to the relationship $$P_s = 3I_a^2 R_a \quad \text{(equation 8)}$$

Losses attributable to synchronous machine field resistance, designated $P_f$, are determined according to the relationship $$P_f = I_f^2 R_f \quad \text{(equation 9)}$$

where $R_f$ is the synchronous machine field resistance and $I_f$ is the synchronous machine field current. Synchronous machine inductive or core losses, designated $P_e$, vary in accordance with synchronous machine air gap flux $\psi$, and machine frequency $\Omega$, as seen by the expression:

$$P_e = k_1 \psi^2 \Omega^2 + k_2 .4 \psi^{1.6} \Omega \quad \text{(equation 10)}$$

where $k_1$ and $k_2$ are each constants. Machine windage losses $P_w$, vary in accordance with the square of machine frequency as seen by the equation:

$$P_w = k_3 \Omega^2 \quad \text{(equation 11)}$$

where $k_3$ is a constant.

Synchronous machine efficiency, $\eta$, defined as the ratio of machine output power to machine input power, can be expressed in terms of losses $P_s$, $P_f$, $P_e$ and $P_w$ and the input power $P_{in}$ as follows:

$$\eta = 1 - ((P_s + P_e + P_w + P_f)/P_{in}) \quad \text{(equation 12)}$$

Under steady-state conditions, machine peak phase stator current $I_s$ varies in accordance with inverter link current $I_d$. Recognizing that $I_d I_s$ under such conditions, and that machine torque T varies in accordance with the product $I_f$ and $I_s$, synchronous machine efficiency can therefore be expressed as a function of machine torque, machine frequency, inverter link current, and machine air gap flux as indicated by the equation:

$$\eta = f(\psi, T, I_d, \Omega) \quad \text{(equation 13)}$$

From actual values of machine frequency and machine torque, optimum values for inverter link current and machine air gap flux, designated $I_{dopt}$ and $\psi_{opt}$, respectively, are obtained from equation 13 by setting $\partial \eta / \partial I_d$ and $\partial \eta / \partial \psi$ equal to zero.

Figure 6A:
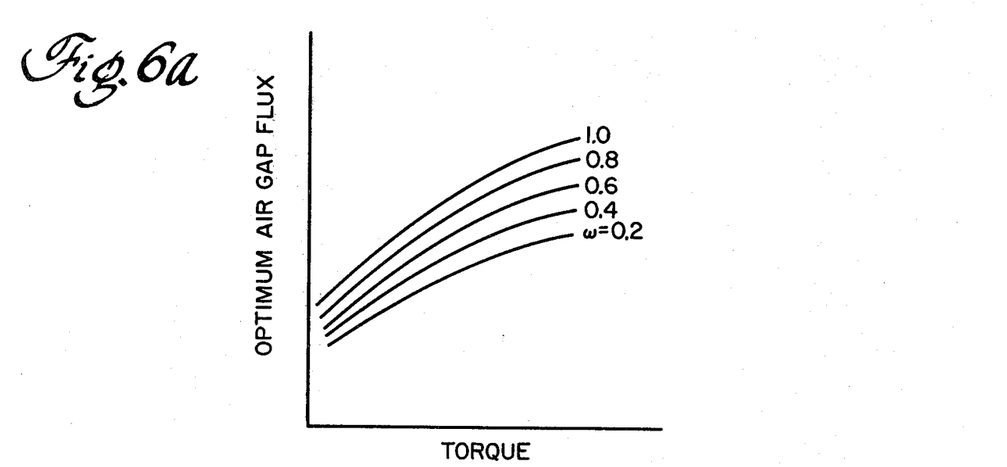
FIG. 6a is a graphical illustration of optimum machine air gap flux versus machine load torque for differing values of machine frequency.
Figure 6B:
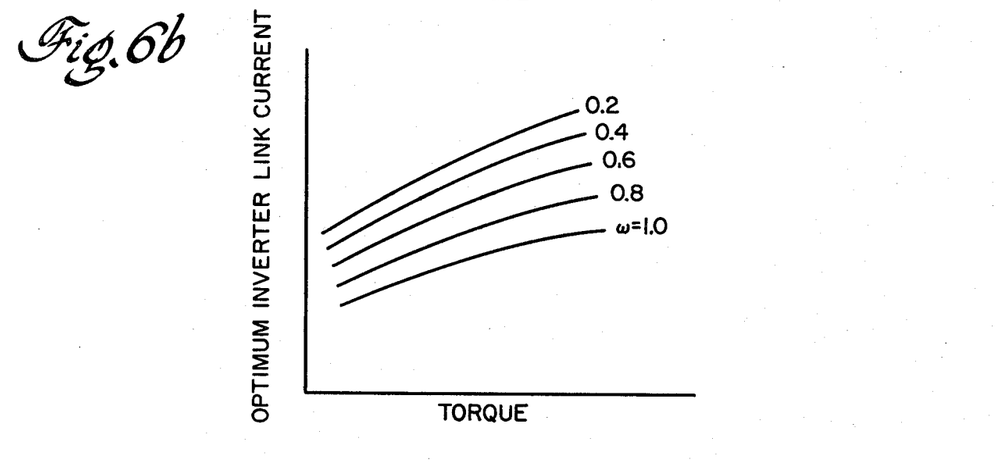
FIG. 6b is a graphical illustration of optimum inverter link current versus machine load torque for differing values of machine frequency.

FIG. 6b graphically illustrates optimum inverter link current versus machine load torque for each of several values of per unit machine frequency. FIG. 6a graphically illustrates optimum synchronous machine flux versus machine load torque for each of several values of per unit machine frequency.

One possible method for generating signals $I_d^*$ and $\psi^*$ includes the steps of storing two sets of look-up tables in the microcomputer memory, the first set containing tables of optimum inverter link current and corresponding torque values, the second set containing tables of optimum synchronous machine air gap flux and torque values, each table within the two sets corresponding to a particular machine frequency. Once synchronous machine frequency and machine torque are determined, appropriate optimum values $I_{dopt}$ and $\psi_{opt}$ for inverter link current and synchronous machine flux, respectively, are obtained from the first and second set of tables, respectively, and signals $I_d$, and $\psi^*$, respectively, can be generated to vary in accordance with $I_{dopt}$ and $\psi_{opt}$, respectively.

In the presently preferred embodiment, derivation of optimum values for inverter link current and machine air gap flux is accomplished by real time computation of synchronous machine losses and efficiency as opposed to the less efficient, storage intensive method described above. To compute synchronous machine losses and efficiency in real time and to obtain optimum air gap flux and inverter link current values from actual machine efficiency, microcomputer 180 executes the stored program illustrated in flow chart form in FIG. 7. Initially, signals t, $\omega$, $p_{in}$, $i_f$ and $i_a$ are "sensed", that is, the magnitude of each signal is established. In accordance with the magnitude of each of signals t, $\omega$, $i_a$, $p_{in}$ and $i_f$, a value for machine torque, machine frequency, machine phase stator current, machine input power, and machine field current, respectively, is established. Once a value for each of these machine parameters is established, machine losses are computed in accordance with equations (8) through (12). After machine losses have been computed, synchronous machine efficiency is computed in accordance with equation (13). Thereafter, $\psi_{opt}$, the optimum air gap flux, is determined by setting $\partial \eta / \partial \psi = 0$.

Figure 7:
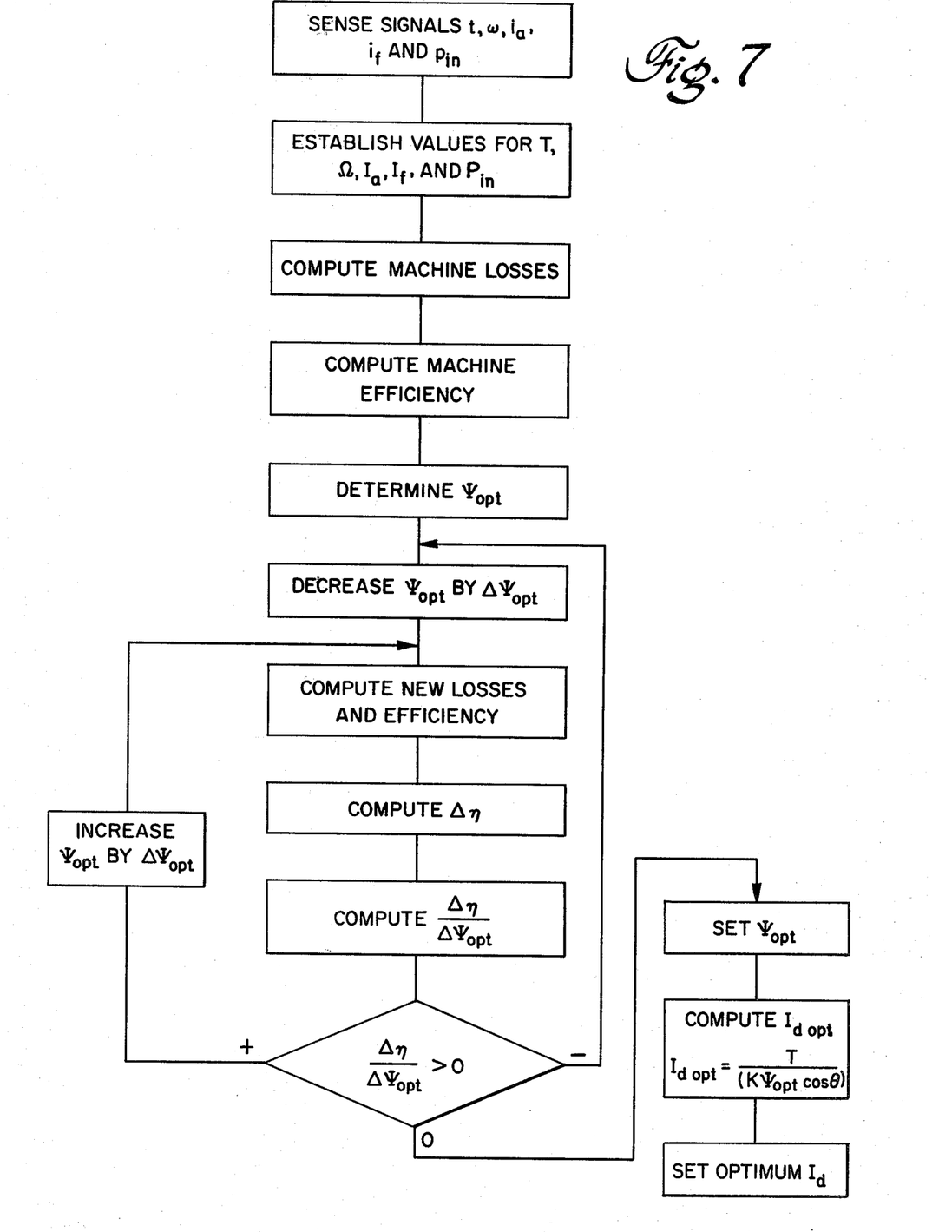
FIG. 7 is a flow chart illustration of the program executed by one of the processors of the control apparatus of FIG. 5 to determine optimum air gap flux and optimum inverter link current.

To determine whether or not the value of $\psi_{opt}$ computed is, in fact, that value of air gap flux necessary to achieve maximum machine efficiency, the value of $\psi_{opt}$ is decremented by the amount $\Delta \psi_{opt}$, where $\Delta$ is typically equal to 0.001 or less, and then machine losses and machine efficiency are recomputed. The difference $\Delta \eta$ between the newly computed and previously computed values of machine efficiency is determined and the ratio of $\Delta \eta / \Delta \psi_{opt}$ is computed. Should the value of $\Delta \eta / \Delta \psi_{opt}$ be greater than zero, indicating that the newly computed value of $\psi_{opt}$ is less than the optimum value of air gap flux, then the newly computed value of $\psi_{opt}$ is incremented by $\Delta \psi_{opt}$ and the following steps are performed:

(a) machine losses and efficieny are recomputed in accordance with equations (8)–(12).

(b) $\Delta \eta$ is computed, and (c) $\Delta \eta / \Delta \psi_{opt}$ is computed.

If the value of $\Delta \eta / \Delta \psi_{opt}$ is again greater than zero, then $\psi_{opt}$ is incremented by $\Delta \psi_{opt}$ and steps (a), (b) and (c) are re-executed. However, should $\Delta \eta / \Delta \psi_{opt}$ be less than zero, indicating that the computed value of $\psi_{opt}$ is actually greater than the true value of optimum air gap flux, then $\psi_{opt}$ is decremented by $\Delta \psi_{opt}$ and steps (a), (b) and (c) are re-executed.

Figure 8:
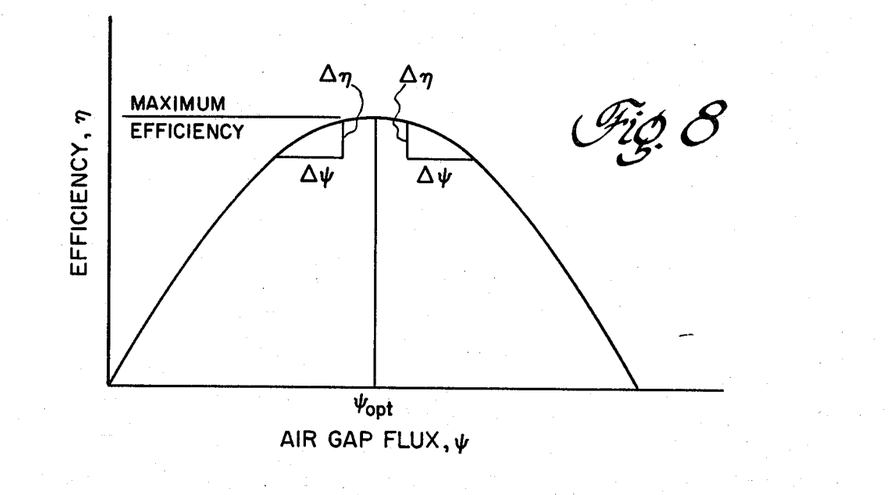
FIG. 8 graphically illustrates the relationship between machine efficiency and air gap flux.

Eventually, after $\psi_{opt}$ is incremented or decremented as required, and steps (a)–(c) are executed, $\Delta \eta / \Delta \psi_{opt}$ becomes zero, indicating that $\psi_{opt}$ now equals true optimum air gap flux. This method of establishing an optimum value for air gap flux by approaching the point of maximum machine efficiency designated as the on-line sensitivity approach method may be better understood by reference to FIG. 8. As may be seen, when the air gap flux is below the true optimum air gap flux, then $\Delta \eta / \Delta \psi_{opt}$ is greater than zero. When the air gap flux $\Delta \psi_{opt}$ is greater than the true optimum air gap flux, $\Delta \eta / \Delta \psi_{opt}$ is less than zero.

Referring back to FIG. 7, once $\Delta \eta / \Delta \psi_{opt}$ is zero, $\psi_{opt}$ is set, and $I_{dopt}$ is computed according to the relationship $$I_{dopt} = T/(K \psi_{opt} \cos \theta) \quad \text{(equation 15)}$$

where $\theta$ is the angle between air gap flux and stator current and K is a constant. Once $I_{dopt}$ is computed, its value is set, and signals $\psi^*$ and $I_d^*$ are produced in accordance with $\psi_{opt}$ and $I_{dopt}$, respectively.

It should be noted, that with respect to the program illustrated in flow chart form in FIG. 7, optimum machine air gap flux could alternately be determined by first establishing an optimal value for inverter link current $I_{dopt}$ in accordance with the on-line sensitivity approach method set forth above and then computing $\psi_{opt}$ from equation (15).

In certain instances it may be desirable to display the calculated value of synchronous machine efficiency to user personnel. This may be readily accomplished by modifying the program illustrated in flow chart form in FIG. 7 so that after $\Delta\eta/\Delta\psi_{opt}=0$, display of machine efficiency is commanded. Microcomputer 180 of FIG. 5 then transmits a display signal $\eta$ to a display apparatus 187 coupled thereto, which provides a visual indication of synchronous machine efficiency. Depending on design considerations, display apparatus 187 of FIG. 5 may be configured of either an analog or digital display.

During intervals of transient conditions, it is not desirable to control inverter link voltage and synchronous machine field voltage by optimizing these parameters in accordance with the technique described above. For this reason, microcomputer 180 of FIG. 5 is supplied from loop 185 with a signal $\sin \theta^*$ varying in amplitude in accordance with the difference between $\Omega^*$, an operator-commanded steady-state machine frequency, and $\Omega$, the actual machine frequency. Microcomputer 180 is responsive to signal $\sin \theta^*$ and when the magnitude of $\sin \theta^*$ exceeds a predetermined value (that is, when $\Omega^*/\Omega>0.9$), microcomputer 180 is rendered inoperative by loop 185 to generate signals $\psi^*$ and $I_d^*$. In the presently preferred embodiment, sensitivity loop 185 comprises a summing amplifier 188 which is supplied at the noninvert input with a signal $\omega_e^*$ varying in amplitude in accordance with $\Omega^*$. Summing amplifier 188 is supplied at the invert input from signal processing circuit 165 with the signal $\omega$ and, in accordance with the difference between signals supplied at its invert and noninvert inputs, summing amplifier 188 provides a frequency error signal to the input of a first sensitivity loop amplifier 190. Amplifier 190 supplies a torque command signal, varying in accordance with summing amplifier 188 output signal, to the noninvert input of a second sensitivity loop summing amplifier 192. The invert input of summing amplifier 192 is supplied from signal processing circuit 165 with the signal t and, in accordance with the difference in magnitude between signals supplied to its invert and noninvert inputs, summing amplifier 192 produces a torque error command signal which is supplied to the input of a second sensitivity loop amplifier 194. Amplifier 194 supplies microcomputer 180 with the signal $\sin \theta^*$ in accordance with the output signal produced by summing amplifier 192. Configured in this manner, control loop 185 regulates the operation of microcomputer 180 and and prevents the microcomputer from generating signals $\psi^*$ and $I_d^*$ during intervals of transient machine conditions.

In summary, the control apparatus of the present invention regulates inverter thyristor conduction frequency to optimize inverter turn-off time, thereby reducing machine reactive power and increasing machine efficiency. Inverter link current and synchronous field current flux are optimized by the present control apparatus in accordance with actual synchronous machine efficiency, to assure synchronous machine operation at maximum efficiency, thereby affecting significant energy savings.

While only certain preferred features of the embodiment have been shown by way of illustration, many modifications and changes will occur to those skilled in the art. Therefore, it is to be understood that the appended claims are intended to cover all such modifications and changes as fall within the true spirit of the invention.

What is claimed is:

1. For use with a load commutated inverter-synchronous machine drive system comprised of a synchronous-machine, a first source of variable amplitude direct current voltage coupled to said synchronous machine for supplying said synchronous machine with field voltage, a second source of variable amplitude direct current voltage, and an inverter coupled between said second source of variable amplitude direct current voltage and said synchronous machine for supplying said synchronous machine with variable amplitude, variable frequency, alternating current, an improved control apparatus for regulating inverter frequency to minimize synchronous machine reactive power and for regulating the voltage supplied by said first and said second sources of variable amplitude direct current voltage to maximize synchronous machine efficiency, said control apparatus comprising:

first means coupled to said synchronous machine and to said first source of variable amplitude direct current voltage, said first means determining optimum synchronous machine air gap flux from actual machine drive system voltages and currents and adjusting the voltage supplied by said first source of variable amplitude direct current voltage responsive to the difference in magnitude between said optimum synchronous machine air gap flux and actual synchronous machine air gap flux;

second means coupled to said synchronous machine and to said second source of variable amplitude direct current voltage, said second means determining optimum inverter link current from machine drive system voltages and currents and adjusting the voltage supplied by said second source of variable amplitude direct current voltage responsive to the difference in magnitude between said optimum inverter link current and actual inverter link current; and third means coupled to said synchronous machine and said inverter, said third means determining the optimum inverter turn-off time from machine drive system voltages and adjusting inverter frequency responsive to the difference in magnitude between optimum inverter turn-off time and actual inverter turn-off time thereby minimizing synchronous machine reactive power.

2. The invention according to claim 1 wherein said first means comprises:

processor means coupled to said synchronous machine, said processor means determining optimum synchronous machine air gap flux from machine drive system currents and voltages and producing a first output signal varying therewith and, said processor means determining actual synchronous machine air gap flux from machine drive system currents and voltages and providing a second output signal varying in accordance therewith; and control loop means coupled to said processor means and to said first source of variable amplitude direct current voltage, said control loop means adjusting the voltage supplied by said first source of variable amplitude direct current voltage responsive to the difference in magnitude between said first and said second processor means output signals.

3. The invention according to claim 2 wherein said processor means comprises:
a signal processing circuit coupled to said synchronous machine and responsive to synchronous machine currents and voltages, said signal processing circuit producing said second signal varying in accordance with actual synchronous machine air gap flux and a plurality of intermediate signals, each of said intermediate signals varying in accordance with the actual magnitude of a preselected synchronous machine parameter; and
optimization processor means coupled to said signal processing circuit and to said control loop means for determining synchronous machine losses and synchronous machine efficiency from said signal processor circuit intermediate signals and said optimization processor means producing said first output varying in accordance with optimum synchronous machine air gap flux signal in response to synchronous machine efficiency.

4. The invention according to claim 3 wherein said signal processing circuit comprises a microcomputer.

5. The invention according to claim 3 wherein said optimization processor means comprises a microcomputer.

6. The invention according to claim 5 further including display means coupled to said microcomputer for providing a visual indication of synchronous machine efficiency.

7. The invention according to claim 6 further including a sensor loop coupled to said microcomputer for rendering said microcomputer inoperative during intervals of transient synchronous machine conditions.

8. The invention according to claim 2 wherein said control loop means comprises:
a first summing amplifier having first and second inputs coupled to said processor means so as to be supplied from said processor means with said first and said second processor means output signals, respectively, said first summing amplifier producing a flux error signal proportional to the difference in magnitude between signals supplied to said first and said second summing amplifier inputs;
first amplifier means coupled to said first summing amplifier and producing a field current command signal in accordance with said flux error signal;
a second summing amplifier having a first input coupled to said first amplifier means so as to be supplied therefrom with said field current command signal and having a second input coupled to said synchronous machine to receive therefrom a signal varying in accordance with actual synchronous machine field current, said second summing amplifier producing a field current error signal proportional to the difference in magnitude between signals supplied to its first and said second inputs;
second amplifier means coupled to said second summing amplifier and producing a field voltage command signal in accordance with said field current error signal; and
a third summing amplifier having first and second inputs, said third summing amplifier being coupled at its first input to said second to receive said field voltage command signal therefrom and being supplied at its second input a signal varying in accordance with actual synchronous machine field voltage, said third summing amplifier producing a field voltage control signal proportional to the difference in magnitude between signals supplied to its first and said inputs, said first source of variable amplitude direct current voltage being supplied with said field voltage control signal and, in response thereto, varying the amplitude of field voltage supplied to said synchronous machine.

9. The invention according to claim 1 wherein said second means comprises:
processor means coupled to said synchronous machine and to said inverter, said processor means determining optimum inverter link current from machine drive system voltage and currents and producing an output signal varying in accordance therewith; and
control loop means coupled to said processor means and coupled to said inverter for receiving a signal from said inverter varying in accordance with actual inverter link current, said control loop means adjusting the amplitude of voltage supplied by said second source of variable amplitude direct current voltage responsive to the difference in magnitude between said processor means output signal and said signal varying in accordance with actual inverter link current.

10. The invention according to claim 9 wherein said processor means comprises:
a signal processing circuit coupled to said synchronous machine and to said inverter, said signal processing circuit producing a plurality of intermediate signals, from machine currents and voltages, each of said intermediate signals varying in accordance with the actual magnitude of a preselected synchronous machine parameter; and
optimization processor means coupled to said signal processing circuit, to said synchronous machine and to said control loop means, said optimization processor means determining synchronous machine losses and synchronous machine efficiency responsive to said signal processing circuit intermediate signals and said optimization processor means producing said output signal varying in accordance with optimum inverter link currents in response to synchronous machine efficiency.

11. The invention according to claim 9 wherein said signal processor circuit comprises a microcomputer.

12. The invention according to claim 9 wherein said optimization processor means comprises a microcomputer.

13. The invention according to claim 12 further including sensor loop means for inhibiting the operation of said microcomputer during intervals of transient machine conditions.

14. The invention according to claim 9 wherein said control loop comprises:
a first summing amplifier having first and second inputs, said first input coupled to said processor means to receive said processor means output signal and said second input coupled to said inverter to receive a signal therefrom varying in accordance with actual inverter link current, said first summing amplifier producing an inverter link current error signal proportional to the difference in magnitude between signals supplied to said first and said second summing amplifier inputs;

amplifier means coupled to said first summing amplifier and producing an inverter link voltage command signal in accordance with said inverter link current error signal; and a second summing amplifier having first and second inputs, said second summing amplifier being coupled at its first input to said amplifier means to receive said inverter link voltage command signal therefrom and being supplied at its second input with a signal varying in accordance with actual inverter link voltage, said summing amplifier producing an inverter link voltage control signal proportional to the difference in magnitude between signals supplied to its first and said second inputs, said second source of variable amplitude direct current voltage being coupled to said third summing amplifier and varying the amplitude output voltage supplied to said inverter in response to said inverter link voltage control signal.

15. The invention according to claim 1 wherein said third means comprises:

processing means coupled to said inverter, said processor means processing inverter output voltage to produce a first output signal varying in accordance with the reverse bias voltage across each incoming inverter switching device and a second output signal varying in accordance with actual inverter turn-off time; and control loop means coupled to said processor means and to said inverter, said control loop means determining the optimum inverter turn-off time in accordance with said first processor means output signal, and, adjusting inverter frequency to minimize synchronous machine reactive current responsive to the difference between said optimum inverter turn-off time and actual inverter thyristor turn-off time.

16. The invention according to claim 15 wherein said processor means comprises a microcomputer.

17. The invention according to claim 15 wherein said control loop comprises:

an attenuator coupled to said processor means and providing an output signal which varies inversely with said processor means first output signal;

a signal source for producing a fixed amplitude output signal;

a first summing amplifier having a first and a second input, said first summing amplifier input being coupled to said attenuator so as to be supplied therefrom with said attenuator output signal, said second summing amplifier input being coupled to said signal source so as to be supplied therefrom with said fixed amplitude output signal, said summing amplifier producing an output signal varying directly with optimum inverter turn-off time in accordance with the sum of signals supplied to said first and second summing amplifier inputs;

a second summing amplifier having a first input coupled to said processor means so as to be supplied therefrom with said processor means second output signal and having a second input coupled to said first summing amplifier so as to be supplied with said first summing amplifier output signal, said second summing amplifier producing an output signal varying in accordance with the difference in magnitude between the signals supplied to its first and second input;

amplifier means having an integral plus proportional gain characteristic and coupled to said second summing amplifier for scaling said second summing amplifier output signal; and a voltage controlled oscillator coupled to said amplifier means and producing a frequency command signal in accordance with said amplifier means output signal, said voltage controlled oscillator coupled to said inverter, said inverter, when supplied with said frequency command signal produced by said voltage controlled oscillator, varying inverter output frequency in accordance therewith.

18. The invention according to claim 17 further including slope detector means coupled to said inverter and to said voltage controlled oscillator for adjusting said inverter frequency command signal in accordance with inverter link current.

19. For use with a load commutated inverter synchronous machine drive system comprising a synchronous machine, a first source of variable amplitude, direct current voltage coupled to said synchronous machine for supplying said machine with field voltage, a second source of variable amplitude direct current voltage and an inverter coupled between said second source of variable amplitude direct current voltage and said synchronous machine for supplying said synchronous machine with variable amplitude, variable frequency alternating current, an improved control apparatus for regulating inverter frequency to minimize synchronous machine reactive power and for regulating the voltage supplied by said first and said second source of variable amplitude direct current voltage to maximize synchronous machine efficiency, said control apparatus comprising:

processor means coupled to said synchronous machine and said inverter, said processor means producing a first signal varying in accordance with optimum synchronous machine air gap flux, a second signal varying in accordance with optimum inverter link current, a third signal varying in accordance with the reverse bias voltage across each incoming inverter switching device and a fourth signal varying in accordance with actual inverter turn-off time;

a first control loop coupled to said processor means, to said synchronous machine and to said first source of variable amplitude direct current voltage, said first control loop adjusting synchronous machine field voltage responsive to the difference in magnitude between optimum synchronous machine air gap flux and actual synchronous machine air gap flux;

a second control loop coupled to said processor means and to said second source of variable amplitude direct current voltage, said second control loop adjusting inverter input voltage responsive to the difference in magnitude between optimum inverter link current and actual inverter link current; and a third control loop coupled to said processor means and to said inverter, said third control loop determining optimum inverter turn-off time from to said processor means third signal and adjusting inverter frequency in accordance with the difference in magnitude between optimum inverter turn-off time and actual inverter turn-off time.

20. For use with a load commutated inverter synchronous machine drive system comprised of a synchronous machine, a first source of variable amplitude direct current coupled to said synchronous machine for supplying said machine with field current, a second source of variable amplitude direct current and an inverter coupled between said second source of variable amplitude direct current and said synchronous machine for supplying said synchronous machine with variable amplitude variable frequency stator current, an improved method for regulating inverter frequency to minimize synchronous machine reactive currents and for regulating synchronous machine field and stator current amplitude to optimize synchronous machine efficiency comprising the steps of:

determining optimum synchronous machine air gap flux from machine drive system voltages and currents and adjusting the amplitude of synchronous machine field voltage responsive to the difference in magnitude between optimum synchronous machine air gap flux and actual synchronous machine air gap flux;

determining optimum inverter link current from actual machine voltages and currents and adjusting the responsive to the difference in magnitude between optimum inverter link current and actual inverter link current; and determining optimum inverter turn-off time from machine voltages and adjusting inverter frequency in accordance with the difference in magnitude between optimum inverter turn-off time and actual inverter turn-off time.

* * * * *